US009881502B2

(12) United States Patent
Sangorrin et al.

(10) Patent No.: US 9,881,502 B2
(45) Date of Patent: Jan. 30, 2018

(54) METHOD FOR ASSISTING A DRIVER OF A MOTOR VEHICLE

(75) Inventors: Jorge Sans Sangorrin, Stuttgart (DE);
Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 648 days.

(21) Appl. No.: 14/344,086

(22) PCT Filed: Jul. 18, 2012

(86) PCT No.: PCT/EP2012/064064
§ 371 (c)(1),
(2), (4) Date: Nov. 10, 2014

(87) PCT Pub. No.: WO2013/037539
PCT Pub. Date: Mar. 21, 2013

(65) Prior Publication Data
US 2015/0054636 A1 Feb. 26, 2015

(30) Foreign Application Priority Data

Sep. 12, 2011 (DE) ........................ 10 2011 082 483

(51) Int. Cl.
*B60Q 1/00* (2006.01)
*G08G 1/16* (2006.01)
(Continued)

(52) U.S. Cl.
CPC ............... *G08G 1/16* (2013.01); *B60Q 9/005* (2013.01); *B60Q 9/007* (2013.01); *B62D 15/029* (2013.01);
(Continued)

(58) Field of Classification Search
CPC .......... G08G 1/16; B60Q 9/005; B60Q 9/007; B62D 15/029; G06F 3/0481; G06F 3/04842; B60K 2350/2017
(Continued)

(56) References Cited

U.S. PATENT DOCUMENTS

2002/0198660 A1* 12/2002 Lutter .................. G08G 1/0965
701/301
2007/0003162 A1 1/2007 Miyoshi et al.
(Continued)

FOREIGN PATENT DOCUMENTS

DE 100 37 128 5/2001
DE 102 50 021 5/2004
(Continued)

*Primary Examiner* — Daryl Pope
(74) *Attorney, Agent, or Firm* — Norton Rose Fulbright US LLP

(57) ABSTRACT

A method for assisting a driver of a motor vehicle during a driving maneuver, which includes the following: (a) detecting data regarding the surroundings of the motor vehicle, analyzing the captured data for detecting objects, and visually displaying the detected objects, (b) selecting at least one of the detected objects by the driver of the motor vehicle, (c) determining the smallest distance between the motor vehicle and the at least one selected object, (d) outputting information to the driver of the motor vehicle about the smallest distance between the at least one selected object and the motor vehicle. Further described is a device for carrying out the method.

13 Claims, 5 Drawing Sheets

(51) Int. Cl.
  *B60Q 9/00* (2006.01)
  *B62D 15/02* (2006.01)
  *G06F 3/0481* (2013.01)
  *G06F 3/0484* (2013.01)

(52) U.S. Cl.
  CPC ........ *G06F 3/0481* (2013.01); *G06F 3/04842* (2013.01); *B60K 2350/2017* (2013.01)

(58) Field of Classification Search
  USPC ................................ 340/435, 436, 901–905
  See application file for complete search history.

(56) References Cited

U.S. PATENT DOCUMENTS

2011/0157184 A1  6/2011  Niehsen et al.
2011/0293145 A1* 12/2011  Nogami ................... B60R 1/00
                                            382/103

FOREIGN PATENT DOCUMENTS

| DE | 10 2005 008 874 | 9/2006 |
| EP | 1 470 958 | 10/2004 |
| EP | 1482280 A2 | 12/2004 |
| JP | H-1086698 | 4/1998 |
| JP | 2004306779 | 11/2004 |
| JP | 2009096347 | 5/2009 |
| WO | 2009147477 | 12/2009 |

* cited by examiner

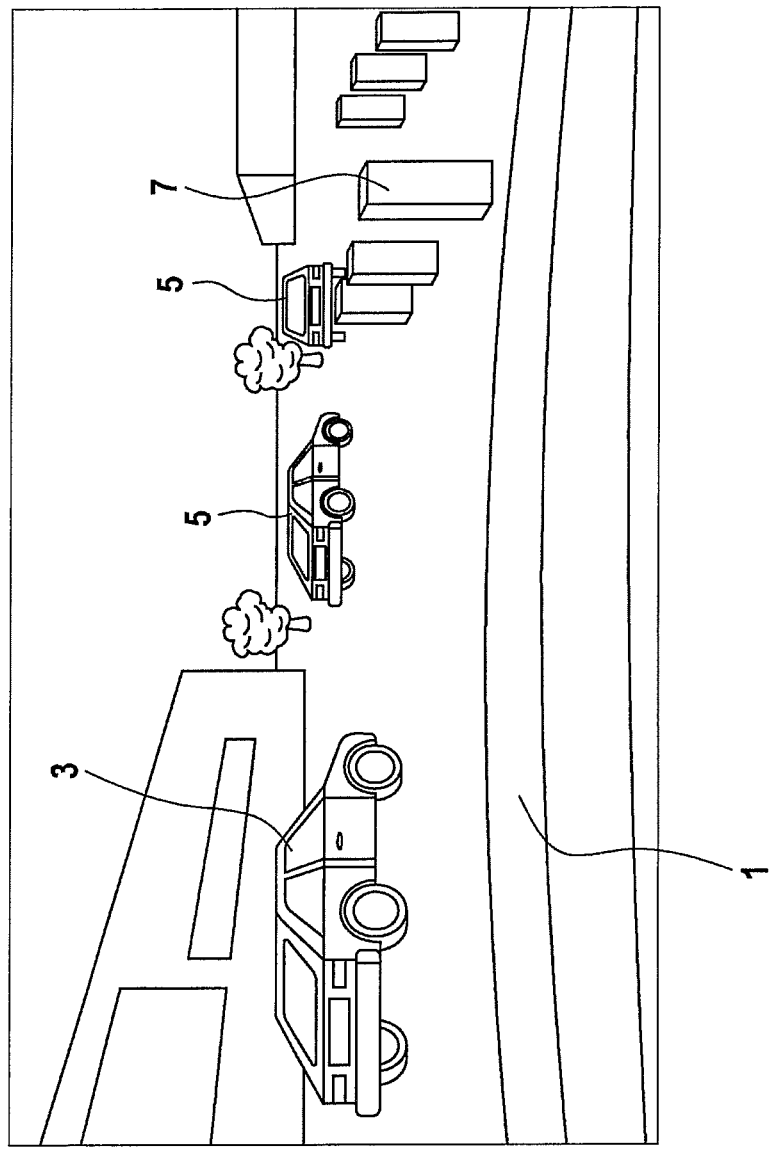
Fig. 1.1

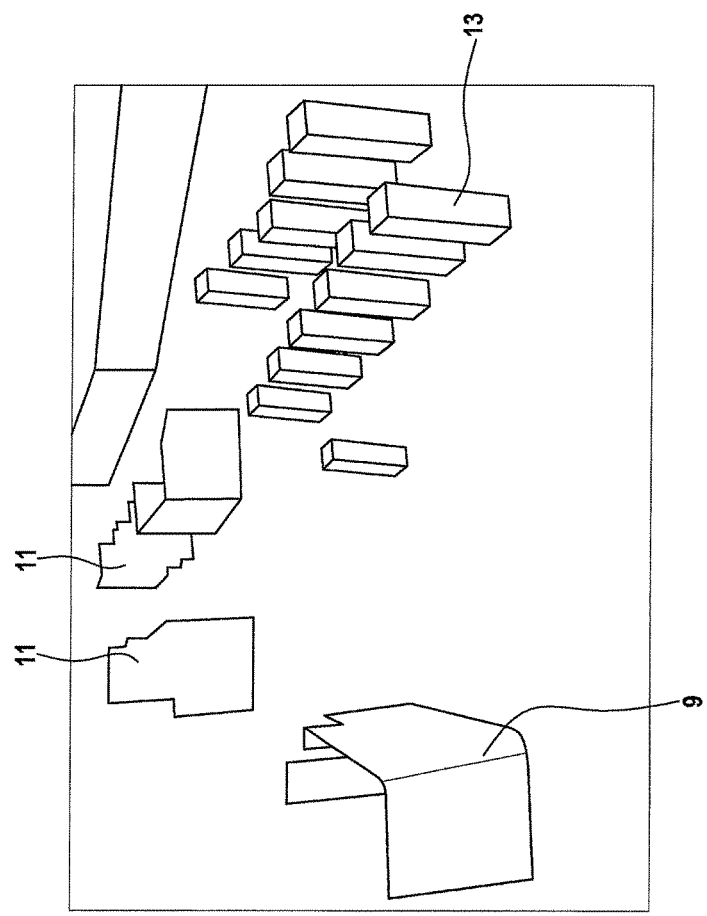
Fig. 1.2

METHOD FOR ASSISTING A DRIVER OF A MOTOR VEHICLE

FIELD OF THE INVENTION

The present invention relates to a method for assisting a driver of a motor vehicle during a driving maneuver.

BACKGROUND INFORMATION

To offer the driver of a motor vehicle assistance during the maneuvering of his motor vehicle, different driver assistance systems are available on the market. In particular, the driver is assisted with the aid of suitable driver assistance systems, for example, when parking or also when maneuvering at low speeds. For this purpose, the surroundings of the motor vehicle are initially detected using suitable sensors, for example, to indicate to the driver the distance to objects in the surroundings of the motor vehicle. The indication of the distance takes place, for example, visually or acoustically, for example, with the aid of an acoustic warning sound, whose frequency increases as a function of a distance becoming shorter, in order to provide information about the proximity to an object in the surroundings of the motor vehicle. Alternatively, a visual indication is also known, for example, the number of lighted LEDs or the length of a bar increasing when the motor vehicle approaches an object. If a minimal distance is not reached, a continuous sound is emitted or a red light is shown to warn the driver, for example. In the case of visual displays, it is also known to show the motor vehicle in a top view to the driver on a display device, for example, a display screen of a navigation system or also a separate display device, and to indicate the distance to an object by distance lines, for example.

A device, which may be used to recognize and signal obstructions, is discussed, for example, in DE 198 21 929 A1. Here, using suitable ultrasound emitters, signals are emitted which reflect off an obstruction. The reflected ultrasound waves are received and the distance to an obstruction is determined on the basis of the time which passes between the emission of the signal and the reception of the echo. The distance to the obstruction is assumed to be the distance detected by the sensor which measures the shortest distance. Corresponding alarm devices, an alarm sound, for example, indicate to the driver of the motor vehicle at what distance the object is located and in which direction it lies.

In the case of the systems from the related art, it is believed that it is only understood in each case to indicate to the driver the distance to the closest object. None of the known systems permit, however, the shortest distance to a specific object in the surroundings of the motor vehicle to be indicated in a targeted manner to the driver or the driver to be informed of the distance to a specific object via acoustic or haptic indicators. In particular, it is believed that it is not possible using such systems for the driver to have the option of selecting an object, whose distance is to be displayed.

SUMMARY OF THE INVENTION

The method provided according to the present invention for assisting a driver of a motor vehicle during a driving maneuver includes the following steps:
(a) detecting data of the surroundings of the motor vehicle, analyzing the captured data for detecting objects, and visually displaying the detected objects,
(b) selection of at least one of the detected objects by the driver of the motor vehicle,
(c) determining the smallest distance between the motor vehicle and the at least one selected object,
(d) outputting an item of information to the driver of the motor vehicle about the smallest distance between the at least one selected object and the motor vehicle.

The method according to the present invention, in which the driver selects an object detected by the system, the distance to which is displayed, prevents the driver from being unable to comprehend why at that moment the system is issuing a warning. In contrast to the known driver assistance systems, in which the shortest distance to an object is not selectively displayed, and the driver therefore sometimes does not know why at that moment the system is issuing a warning, the targeted selection of an object by the driver and the display of the distance to this object provide the driver with the desired assistance during the driving maneuver to be carried out.

It is thus possible, for example, that the driver selectively targets an object, for example, a column or a parked motor vehicle in a parking garage, which flanks his parking space, into which he now would like to drive. A high level of system understanding is therefore provided to the driver and he may concentrate on the remaining driving actions and purposefully incorporate the information on the distance to the selected object, for example, the column or the other motor vehicle, in his planning and execution of the driving maneuver.

Also during the approach to a ticket machine when entering a parking garage, for example, the driver may selectively target the machine and then control the motor vehicle, taking into account the information on the distance to the machine provided by the system.

In addition to columns or motor vehicles when parking or ticket machines, further obstructions which may be specifically displayed are, for example, walls, hedges, plant containers, or the like.

Another advantage of the method according to the present invention is that when parking or maneuvering the motor vehicle, even in tricky situations, there is no longer the need for a second person, who gives the driver further information, for example, about the distance to a specific object. It is also no longer necessary for the driver to have to detect the surroundings around the motor vehicle by a forceful turn of the head. This is advantageous in particular for drivers with limited movement capability.

Selection of the at least one of the detected objects by the driver of the motor vehicle in step (b) may involve, for example, the driver of the motor vehicle selecting the object by marking the object in the visual display. In this way, the driver assistance system used to carry out the method is provided with specific information about the object to be observed.

The marking of the object may be carried out, for example, by tapping on a touchscreen. Alternatively, it is also possible that, for example, a touchpad or a trackball is used, with which the driver moves a pointer onto the object to be marked and then marks the object, for example, by tapping the touchpad or by pressing a button. Further possibilities for marking are, for example, initially selecting the object using a multifunction switch and subsequently marking by activating the multifunction switch.

The objects may be displayed to the driver in a top view or three-dimensionally. In the case of a display in top view, the objects are each displayed at the corresponding positions—in relation to the contour of the vehicle of the driver—at which they have been detected by the surroundings detection system of the motor vehicle. A three-dimensional display may be particularly used, the display in this case may correspond to the field of vision of the driver, so that he may recognize and mark the relevant object in a simple way based on the three-dimensional display.

To obtain a clear display, the driver may also be given the option of deleting a selected object from the display by activating a control element. By deleting objects, the driver may leave specifically those objects whose distances interest him, in order, for example, to avoid confusion in the event of objects located one behind another and to select precisely the object which interests the driver and not inadvertently one located in front of or behind it.

It is also advantageous if the driver is given the option of canceling a selection that has already been made. This may be done, for example, by the driver marking and selecting a previously selected object a second time.

In one specific embodiment, all objects which flank a driving path, which is predicted based on the present driving situation, are highlighted in the display. Highlighting the objects which flank the predicted driving path has the advantage that the attention of the driver is directed in particular to the objects which are of interest for carrying out the planned driving maneuver. Objects which are further removed from the predicted driving path and therefore do not represent a risk for the driving maneuver to be carried out are thus removed from the driver's area of attention.

The predicted driving path is determined, for example, on the basis of driving information. For this purpose, for example, the present steering wheel angle or the curvature of the presently traveled trajectory derived therefrom, and the speed of the motor vehicle are taken into consideration. On the basis of the steering wheel angle and the speed of the motor vehicle, the motor vehicle's anticipated further course of travel may be detected. Upon activation of the steering wheel by the driver, the predicted driving path is recalculated and in this case, for example, objects different from the original objects may also be highlighted as a result of an adjustment to the predicted driving path. Objects selected by the driver of the motor vehicle continue to remain selected, however, until the driver deselects them again.

In order in particular to avoid a collision with the selected object, it furthermore may be that a warning signal is output as soon as the smallest distance between the motor vehicle and the at least one selected object falls short of a predefined minimum distance. The minimum distance may be predefined by the driver assistance system and stored in a suitable memory unit of the driver assistance system. Here, it is also possible to provide different minimum distances to one object as a function of the position of the object in relation to the motor vehicle. It is thus possible, for example, to provide a smaller minimum distance if the object is located laterally adjacent to the motor vehicle and a greater minimum distance if the object is in front of or behind the motor vehicle. The greater minimum distance in the event of an object in front of or behind the motor vehicle is used in particular so that the motor vehicle may still be braked in a timely manner before a collision with the object when the warning signal is output.

The warning signal may be, for example, a visual, acoustic, and/or haptic warning signal. In particular a warning sound is suitable as an acoustic warning signal, and a warning light is suitable as a visual warning signal, for example. A haptic warning signal may be, for example, the motor vehicle braking suddenly or the steering wheel being caused to vibrate.

A suitable device for carrying out the method includes an arrangement for detecting the surroundings and an arrangement for analyzing detected data for detecting objects and to display the detected objects, an arrangement for selecting at least one of the displayed objects, and an arrangement for determining the distance between the at least one selected object and the motor vehicle.

In particular, distance sensors are used as the arrangement for detecting the surroundings. The distance sensors may be, for example, ultrasound sensors, infrared sensors, radar sensors, lidar sensors, or other optical sensors, for example, video cameras. As a function of the distance sensors used, the distance to an object is determined, for example, by emitting a signal and receiving an echo reflected from the object or alternatively, in particular if video cameras are used, by a suitable image processing method.

A control unit having a suitable processor may be used used to analyze signals detected by the distance sensors, to detect objects in the surroundings of the motor vehicle, and to determine the distance between a selected object and the motor vehicle. Alternatively, it is also possible to provide a separate analysis unit, which may also be arranged on the sensor, for example. However, a suitable control unit may be used. The control unit may furthermore also include a memory arrangement, in which a requested minimum distance may be stored, for example.

For example, a monitor or a heads-up display may be used as the arrangement for displaying the detected objects. A touchscreen may be used to display the detected objects. This touchscreen may then also be used to select at least one of the displayed objects. If the display occurs on a monitor or in a heads-up display, it is possible to use a touchpad, a trackball, or a multifunction switch, for example, as the arrangement for selecting at least one of the displayed objects. Furthermore, the recognition of voice commands or a natural linguistic voice control or a gesture recognition and any other arbitrary control device, for example, consumer electronics products, may also be used.

Exemplary embodiments of the present invention are shown in the figures and will be explained in greater detail in the following description.

BRIEF DESCRIPTION OF THE DRAWINGS

FIG. 1.1 shows a traffic scenario through the windshield of a motor vehicle.

FIG. 1.2 shows a three-dimensional view of detected measured data of the scenario shown in FIG. 1.1.

DETAILED DESCRIPTION

Figure 2:
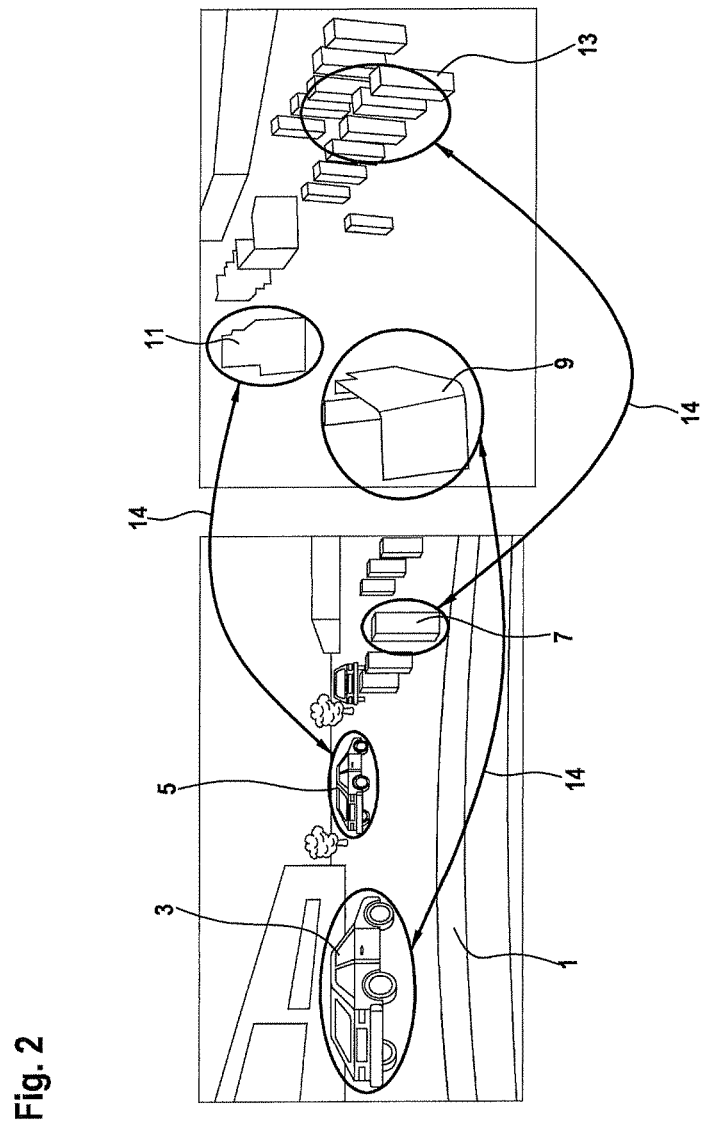
FIG. 2 shows an assignment of objects of the scenario to the three-dimensionally displayed measured data.

FIG. 1.1 shows a traffic scenario through a windshield of a motor vehicle.

Engine hood 1 of the motor vehicle may initially be seen in the lower area of the view through the windshield.

In the traffic scenario shown in FIG. 1.1, a further motor vehicle 3 is located on the left side ahead of the motor vehicle. Parking motor vehicles 5 may be recognized in the travel direction ahead of the motor vehicle. In addition, still further obstructions 7 are located ahead of the motor vehicle, obstructions 7 being visible on the right side in front of the motor vehicle.

To assist the driver of the motor vehicle during a driving maneuver, the surroundings of the motor vehicle are initially detected. To detect the surroundings of the motor vehicle, distance sensors, for example, ultrasound sensors, radar sensors, lidar sensors, infrared sensors, or other optical sensors, for example, cameras, are conventionally used. The surroundings of the motor vehicle, in particular the distance to objects in the surroundings of the motor vehicle, are detected using the appropriate sensors.

The data detected using the surroundings detection system may be displayed on a display screen, for example, a monitor of a driver assistance system of the motor vehicle, for example, of the navigation system, or a separate display unit. This is shown by way of example in FIG. 1.2 for the traffic scenario shown in FIG. 1.1. The three-dimensional display does not indicate the type of object in each case; only the contour of the detected objects is shown. Thus, for example, the contour of motor vehicle 3 detected by the surroundings detection system may be recognized on the left side, designated with reference numeral 9. Also detected using the surroundings detection system are parking motor vehicles 5 ahead of the motor vehicle, which are visible here as contour 11.

Furthermore, contours 13 of obstructions 7 may also be seen from the three-dimensional view shown in FIG. 1.2 of the traffic scenario shown in FIG. 1.1.

Objects 3, 5, 7, which delimit the driving path of motor vehicle 1, and the display of respective contours 9, 11, 13 already enable the driver of the motor vehicle to make an initial assessment regarding a possible maneuvering of the motor vehicle.

Still, however, no indication of the distance of the motor vehicle to the respective objects in the surroundings of the motor vehicle is given in the three-dimensional display of the surroundings of the motor vehicle shown in FIG. 1.2. This distance may only be vaguely discerned in the case of a three-dimensional display as shown in FIG. 1.2.

FIG. 2 illustrates once again which contours are associated with which objects of the traffic scenario. The respective associations are shown by marking the object and marking the contour, the respective objects and contours associated with one another being connected by a double arrow 14.

In presently used driver assistance systems, the distance to the closest object is indicated to the driver. The indication of the closest object takes place acoustically or visually, in the case of an acoustic indication the distance to the closest object being indicated by warning sounds, the frequency of the warning sounds increasing with decreasing distance. It is also known to provide light bars or the like, the length of the light bar increasing or also the color changing with decreasing distance and a red signal becoming visible, for example, when falling short of a predefined minimum distance, in order to inform the driver of the motor vehicle of the small distance and to allow timely braking before a collision with the object. In the case of an acoustic indication, a continuous sound is usually emitted when falling short of a predefined minimum distance.

Since in the case of many driving maneuvers, which the driver carries out independently, only the indications of the distance to objects, in particular the distance to specific objects, are required by the driver, the driver of the motor vehicle must be able to clearly associate the distance signal with an object. This is not always possible using the known systems.

In the case of the method according to the present invention, the driver selects an object from the display of the surroundings, for example, the contour display of the objects in the surroundings, the distance to which is then indicated.

Figure 3:
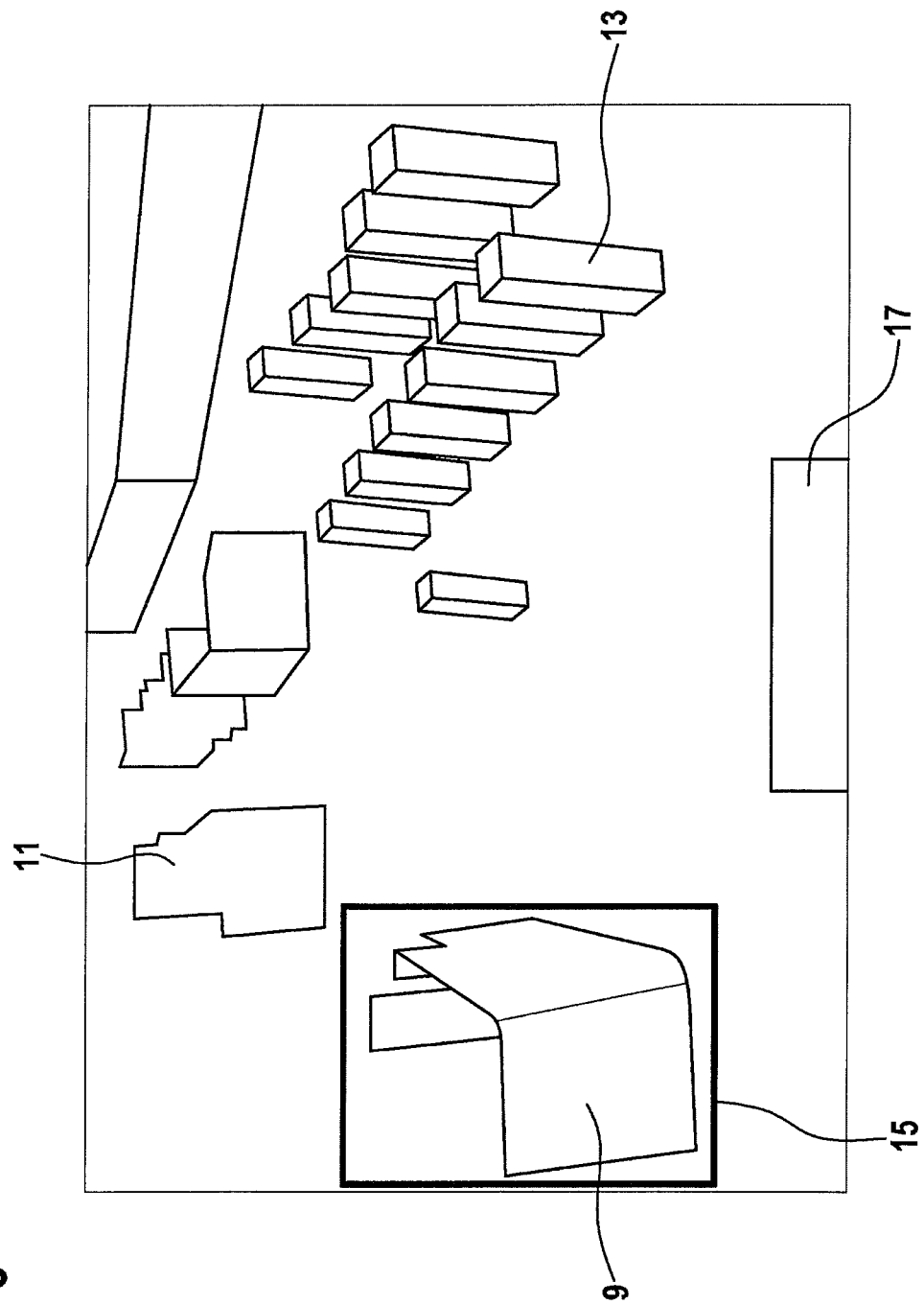
FIG. 3 shows a selection of an element in the three-dimensional display of the measured data.

The selection of an object is shown by way of example in FIG. 3.

The contours shown in FIG. 3 correspond to those of FIGS. 1.2 and 2.

The driver of the motor vehicle initially selects an object, the distance to which is to be indicated. The selection of the object may be carried out, for example, by tapping on a touchscreen. Alternatively, it is also possible to provide a mouse pointer, for example, which is moved onto contours 9, 11, 13 of the object to be selected, after which the object is marked by operating a button. The marking of a selected object may be carried out as shown in FIG. 3, for example, by framing the selected contour using a corresponding frame 15. In this case, it is possible, for example, that frame 15 has a color different from the color of the object contours.

To further orient the driver of the motor vehicle, it is also possible to indicate the engine hood of the host motor vehicle, for example. This takes place in the display shown in FIG. 3 by a rectangle 17 at the lower edge of the image. To indicate to the driver of the motor vehicle that rectangle 17 is a schematic display of the host motor vehicle, it may also be represented in a color different from contours 9, 11, 13 of the detected objects, for example.

After the selection of the object by marking the corresponding contour associated with the object, the distance to the selected object is indicated to the driver of the motor vehicle. The indication of the object may take place visually or acoustically as known from the related art, for example, by the visual display of lengthening bars or also by a sound which changes in frequency as a function of the distance. In addition, a haptic indication, for example, in the form of vibrations of the steering wheel or a pedal of the motor vehicle, is also possible.

If the driver of the motor vehicle desires an indication of the distance to more than just one object, it is also possible in one specific embodiment according to the present invention to select multiple objects.

In particular during driving maneuvers in visually obstructed areas, it may be necessary to show the distance to more than just one object, since the view of the driver of the motor vehicle is restricted. He is unable to monitor the entire surroundings around the motor vehicle simultaneously. Therefore, the driver of the motor vehicle will in particular be shown the distance to the objects which are difficult to see during the driving maneuver.

The marking of the various objects may be carried out as described above, in that the driver marks the respective objects, the distance to which is to be indicated by touching a touchscreen. Alternatively, as already described, the object may be marked, for example, by the recognition of voice commands, the use of a gesture recognition, the implementation with the aid of a multifunction switch or multifunction button, or the movement of a mouse pointer on the object and subsequent operation of a corresponding button.

Figure 4:
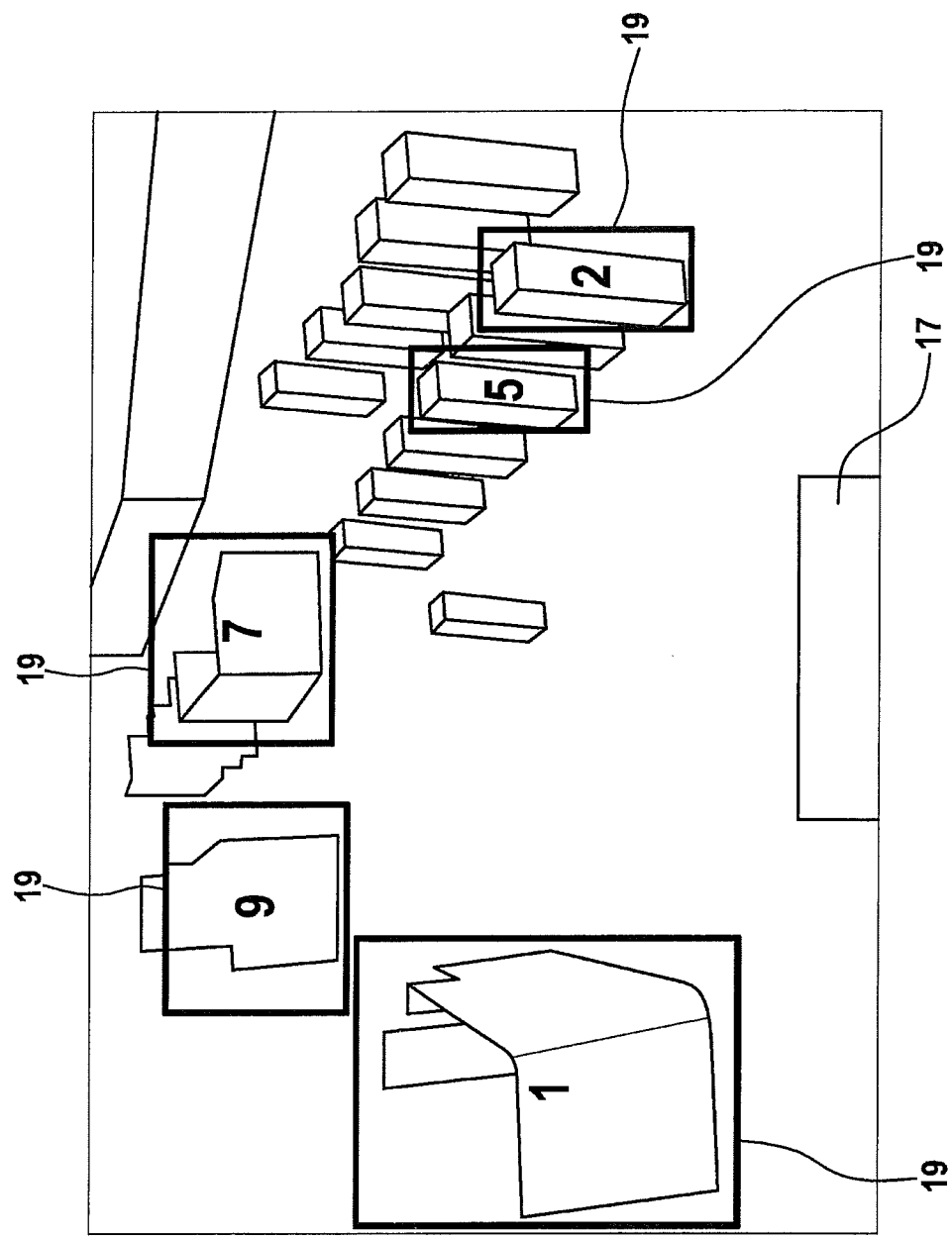
FIG. 4 shows a highlighting of multiple objects, which border the predicted driving path, in the three-dimensional display of the measured data.

Another alternative for selecting an object is shown in FIG. 4. For this purpose, a possible driving path is initially determined, along which the motor vehicle will presumably be moved. Subsequently, the contours of the objects which delimit the predicted driving path and are closest to the driving path are highlighted by markings 19, for example, by rectangles, as shown in FIG. 4. The individual object contours highlighted in each case by one marking 19 may be assigned a number. By selecting the number, the driver of the motor vehicle may then select the object or the objects, the distance to which is to be indicated.

In addition to the selection by a touchscreen or alternatively by a touchpad or another control unit, with which a mouse pointer may be moved, for example, arbitrary buttons, indicators, or other control elements may also be used to select and mark the object, the distance to which is to be indicated.

In another specific embodiment, it is provided that the driver may also delete contours from the display, to thereby enhance the clarity of the display, for example. Thus, for example, the contours which are farther away from the driving path and therefore will not interfere with the driving maneuver may be deleted. Also for this purpose, the object to be deleted is initially selected and marked by the driver, after which the object is deleted by pressing a corresponding delete key. In the case of a touchscreen, it is possible for this purpose, for example, to already provide the respective control panels on the touchscreen, the touching of which triggers corresponding actions, for example, the deletion of an object. If the selection is not made via a touchscreen but rather via a touchpad or another control element, it is thus possible, for example, to provide additional switches or also to provide a corresponding panel in the display, onto which a mouse pointer may then be moved, for example, to activate the corresponding panel.

Furthermore, the method may also be used for driving actions oriented in reverse. For this purpose, the display of the host vehicle and the surroundings may be imaged in the form of a bird's eye perspective. Surrounding objects once selected or marked by the driver also remain active when they are no longer in the field of vision of the display element. The driver may thus travel past an object, for example, a guard rail in a cul-de-sac, and receive the known system reaction, if he reverses again and approaches the object properly.

What is claimed is:

1. A method for assisting a driver of a motor vehicle during a driving maneuver, the method comprising:
   (a) detecting data regarding the surroundings of the motor vehicle, wherein the data is based on at least two detected objects, analyzing the detected data, and visually displaying the at least two detected objects;
   (b) selecting a specific object of the at least two detected objects by the driver of the motor vehicle;
   (c) determining the smallest distance between the motor vehicle and the selected object; and
   (d) outputting information to the driver of the motor vehicle about the smallest distance between the selected object and the motor vehicle.

2. The method of claim 1, wherein the driver of the motor vehicle selects the object in (b) by marking the object.

3. The method of claim 1, wherein the driver marks the object by tapping on a touchscreen.

4. The method of claim 1, wherein the at least two detected objects are displayed in a top view or three-dimensionally.

5. The method of claim 1, wherein a selected object is deleted from the display by activating a control element.

6. The method of claim 1, wherein all objects, which flank a driving path predicted based on instantaneous driving situation, are highlighted in the display.

7. The method of claim 1, wherein a warning signal is output as soon as the smallest distance between the motor vehicle and the at least one object falls short of a predefined minimum distance.

8. The method of claim 7, wherein the warning signal includes at least one of a visual signal, an acoustic signal, and a haptic warning signal.

9. A device for assisting a driver of a motor vehicle during a driving maneuver, comprising:
   a system, including:
      a detecting arrangement to detect the surroundings of the motor vehicle;
      an arrangement to analyze captured data and detect at least two objects;
      a display arrangement to display the at least two detected objects;
      a selecting arrangement to select a specific object of the displayed at least two objects; and
      a determining arrangement to determine the distance between the selected object and the motor vehicle.

10. The device of claim 9, wherein the detecting arrangement for detecting the surroundings includes distance sensors.

11. The device of claim 9, wherein the arrangement to analyze captured data and detect objects, and the determining arrangement to determine the distance between the selected object and the motor vehicle includes a control unit having a processor.

12. The device of claim 9, wherein the displaying arrangement to display the at least two detected objects includes a monitor or a heads-up display.

13. The device of claim 9, wherein the selecting arrangement to select a specific object of the at least two displayed objects include a touchscreen, a touchpad, a trackball, a multifunction switch, the recognition of voice commands, a natural linguistic voice control, or a gesture recognition.

* * * * *